Figure 1:
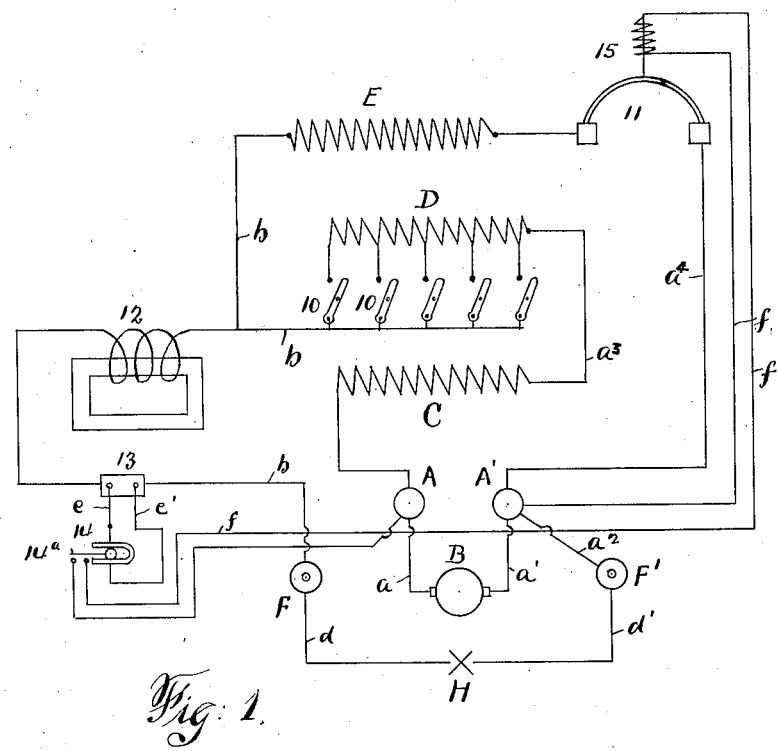

O. A. KENYON.
ELECTRIC WELDING APPARATUS.
APPLICATION FILED OCT. 29, 1912.

1,154,320.

Patented Sept. 21, 1915.

Witnesses:

Otis A. Kenyon, Inventor,
By his Attorney,

UNITED STATES PATENT OFFICE.

OTIS ALLEN KENYON, OF HASTINGS-UPON-HUDSON, NEW YORK, ASSIGNOR TO JOHANNES KJEKSTAD AND WILHELM SCHENSTROM, OF NEW YORK, N. Y.

ELECTRIC WELDING APPARATUS.

1,154,320.  Specification of Letters Patent.  Patented Sept. 21, 1915.

Application filed October 29, 1912. Serial No. 728,337.

*To all whom it may concern:*

Be it known that I, OTIS A. KENYON, of Hastings-upon-Hudson, Westchester county, New York, have invented a new and useful Improvement in Electric Welding Apparatus, of which the following is a full, clear, and exact description.

My invention relates to improvements in the art of electric welding, and the object of my invention is primarily to produce a more efficient system than is commonly employed, by arranging the circuits and apparatus in such a way that the efficiency will not depend so much on the skill of the operator, and especially to provide a complete and simple means for controlling the welding arc. Arc controllers have generally been designed to meet the requirements of the generator rather than the arc itself, the object being to maintain a constant load on the generator without reference to the control of the welding arc.

In arc welding, both carbon and metal pencil, but especially with a metal electrode or pencil, where the arc is very short, a great deal of trouble is experienced from continual interruption of the arc, due to a slight vibration of the hand of the operator. If the pencil approaches the work too closely, it freezes to it, and if it recedes too far from the work, the arc is broken.

To overcome this difficulty due to lack of skill of the operator, and to facilitate convenience and safety in operating a welding arc, are further objects of my invention. In carrying out this idea I provide controlling means by which the value of the current can be adjusted in advance, and the apparatus set so that a load of an equivalent arc will be imposed upon the generator, the equivalent arc current being of the same value as the current carried across the welding arc terminals, and the equivalent arc circuit being automatically broken when the welding arc is sprung. This greatly facilitates the welding operation, as it enables a controller to be set in the first instance at the desired current value as indicated by suitable instruments, and avoids the necessity of constant manipulation of the controller after the welding arc is struck. Furthermore, I provide an impedance or reactor in the circuit of the welding arc, which serves as a balance or ballast to compensate for the fluctuations occasioned by the variance in the length of the arc caused by the imperfect movements of the tool or pencil as above noted, also to take up the shock of short circuit in the first instant when the circuit is closed. This will be fully understood from the description which follows.

Reference is to be had to the accompanying drawings forming a part of this specification, in which similar reference characters indicate corresponding parts in all the views.

Figure 2:
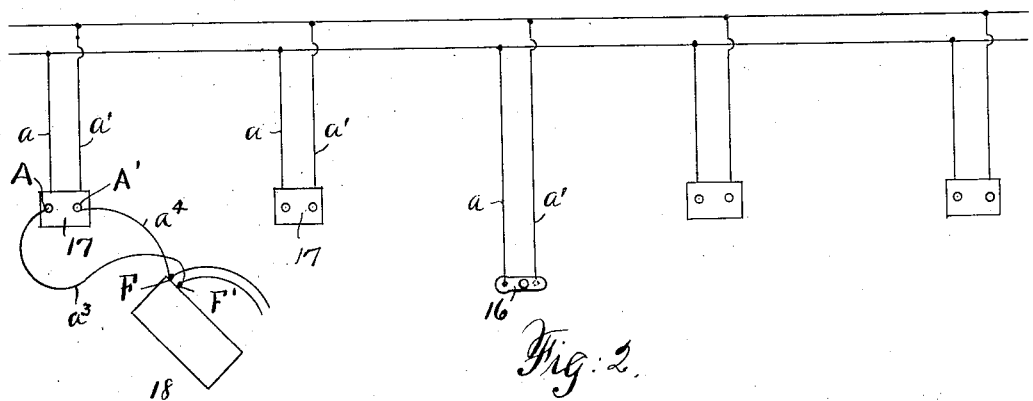

Figure 1 is a diagram of one of the units of the system, and Fig. 2 is a diagram showing the general arrangement where several units are used connecting with a single source of current supply.

The diagram shows a simple and convenient form of my invention, in which the terminals A and $A^1$ are connected across the source of electric energy by means of the wires $a$ and $a^1$, the source of energy being in this instance a generator B, which can be either a direct or alternating generator. No novelty is claimed for the various details of the system, and in actual use it is desirable to construct the terminals A and $A^1$ so that a mistaken connection which might cause a short circuit, will be impossible. From the terminal A the circuit passes through the wire $a^3$ and the resistor C, to the adjustable resistor D, thence through one of the several switches 10 and the wire $b$ back through the impedance coil or resistor E, the automatic switch 11, and the wire $a^4$ back to the source of current supply. The wire $b$ branches, and one branch includes the reactor or impedance coil 12, the shunt 13, and the terminal F to which one of the wires $d$ leading to the pencil or tool is connected, while the opposite terminal $F^1$ has a connector $d^1$ which forms one connection across the welding arc, and the terminal $F^1$ is connected to the terminal $A^1$ by the wire $a^2$. The shunt 13 connects by the wires $e$—$e^1$ with the relay 14, the armature $14^a$ of which is adapted to make and break the circuit which includes the wire $f$ and the automatic switch 11, this being controlled through the solenoid 15. If desired, practically the same purpose can be served by substituting a series relay for the shunt 13.

Fig. 1 of the drawing represents one unit of the system, and it will be understood that as many units can be connected up with the terminals A—$A^1$ as may be desired.

It is an advantage of this system that so long as there is sufficient current, a whole series of units may be connected with a single source of supply. Referring to Fig. 2, 16 represents the generator switchboard from which the leads $a$—$a^1$ lead to the several stanchions 17 which can be conveniently arranged, and which carry the terminals A—$A^1$ above referred to. From these terminals the leads $a^3$—$a^4$ continue through the circuit as above described to the terminals F—$F^1$, which for convenience in connection with the whole system shown in Fig. 1, are arranged in the portable controller box 18 which can be moved to any convenient point. I have not shown the controller box in detail, because obviously this forms no part of the invention.

The mode of operation is as follows: The source of electric energy, which may be either $a$, $c$, or $a$, $c$, is located in a position most suitable for its economic operation, and from it are run distributing leads to all points where welding is likely to be done, Fig. 1 showing one of these leads, and Fig. 2 the general arrangement. The operator moves the controller to a position convenient to the work to be done, and connects the terminals A—$A^1$ to the line or source of electric energy as already described. Upon closing the first switch 10 of the adjustable resistor D, the circuit is completed through the resistors C and D and switch 11, back to the generator, the electricity flowing through the wire $a^3$, the resistors C and D, a switch 10, the wire $b$, the resistor or impedance coil E, the switch 11, and the wire $a^4$ back to the generator. The switches 10 are now manipulated until the current through the impedance coil E is brought to the value desired for use with the welding arc, that is to say, if a current of 150 amperes is used at the arc, the switches are adjusted so that the equivalent arc above described will take 150 amperes of current. The next step is to connect the welding circuit which includes the arc across the terminals F—$F^1$, then when the arc is struck at H, this representing the point of contact between the welding material and the welding tool, the electricity will be shunted around the impedance of the equivalent arc E, the electricity passing through the wire $b$, the reactor 12, the shunt 13, the wire $b$, the terminal F, the wire $d$, the arc H, the wire $d^1$, the terminal $F^1$, the wire $a^2$, the terminal $A^1$ and the wire $a^1$ to the generator. In the first instant the impedance of the arc is extremely low, and the current tends to increase at a rapid rate, but the reactor 12 prevents a too rapid building up of the current. Furthermore, as the current reaches an appreciable value, the drop over the shunt 13 operates the relay 14 which in turn opens the excitation circuit of the switch 11 and causes it to drop out, thus cutting the equivalent arc impedance from the circuit. Now if the equivalent arc impedance has been properly dimensioned the current will quickly take up the value to which it was adjusted before the arc was struck. Thus it will be seen that the purpose of the equivalent arc circuit is to enable the operator to adjust the value of the electromotive force and current with certainty and despatch, and without striking an arc. Incidentally, in conjunction with the automatic switch 11, it acts to prevent large fluctuations in the total load when the arc is frequently interrupted, and in this respect it is very successful. It would also be possible, and under some conditions it might be desirable, to arrange the equivalent arc impedance so that a definite portion of it would be in series with the welding arc at the moment contact is made.

The reactor 12 which is always in series with the arc, retards all fluctuations in the value of the current. If the operator brings the welding pencil or electrode too close to the work, it prevents an instantaneous increase in the current, and if his hand is shaking, the electrode will have time to recede before the current has so greatly increased as to cause a bridge to be formed between the electrode and the work. If the electrode recedes too far from the work, the reactor will cause the current to hold on and will maintain the arc for a few instants. In this way the reactor 12 automatically compensates for a slight shaking of the operator's hand, and thus it requires less skill to weld when this controlling system is used than is generally required, or with the same degree of skill the operator can successfully manipulate longer welding pencils.

It will be understood that this system can be used in connection with either carbon pencils or with metal pencils which form the flux to facilitate the welding operation.

I wish to emphasize the fact that the important feature of my invention lies in the use of a resistance equivalent to that of the welding arc, which is substituted for the arc when the latter is not in use, and which permits the operator to adjust the value of the current before beginning work and when the arc is struck, the equivalent arc is automatically dropped from the circuit.

I claim:—

1. An electric welding system comprising an electric circuit, a resistance in said circuit which is equivalent to the resistance of the welding arc, a second or branch circuit connected to the first circuit and which includes and is closed by the striking of the welding arc, an adjustable resistance common to both circuits, a reactor in said second circuit, and means for automatically cutting out the equivalent resistance when the arc is struck and the circuit closed through the reactor.

2. An electric welding system comprising an electric circuit, a resistance in said circuit which is equivalent to the resistance of the welding arc, a second or branch circuit which includes and is closed by the striking of the welding arc, an adjustable resistance common to both circuits, and means for automatically cutting out the equivalent resistance of the first circuit when the arc is struck and the second circuit closed.

3. An electric welding system comprising an electric circuit connected to the circuit of the welding arc, a resistance in said first circuit in parallel with and equivalent to the resistance of the welding arc, a second circuit connected to the first circuit and including the welding arc, said second circuit being closed by the striking of the arc, a reactor in said second circuit, and an automatic switch in said first circuit arranged to cut out the aforesaid equivalent resistance when the arc is struck thereby leaving the reactor in circuit with the welding arc so long as the latter is closed.

4. An electric welding system comprising an electric circuit connected to the circuit of the welding arc, a resistance in said first circuit which is equivalent to the resistance of the welding arc, a second circuit including the welding arc which is closed by the striking of said arc, automatic means for cutting out the equivalent resistance in the first circuit when the second circuit is closed, and an adjustable resistance common to both circuits which can be set before the arc is struck.

5. An electric welding system comprising an electric circuit connected to the circuit of the welding arc, a resistance in said first circuit in parallel with the welding arc, a second circuit connected to the said first circuit and including the welding arc, means for cutting out the resistance of the first circuit by the striking of the arc in the second circuit, and a manually adjustable resistance common to both circuits which can be set before the arc is struck to the desired resistance of the welding arc.

6. An electric welding system comprising an electric circuit connected to the circuit of the welding arc, a resistance in said first circuit in parallel with the welding arc and of essentially equivalent resistance, a second or branch circuit connected to the said first circuit and to the welding arc, an automatic switch operated by the striking of the arc and which is arranged to cut out the aforesaid equivalent resistance when the arc is struck, and means for adjusting the said equivalent resistance before the arc is struck to the desired resistance of the arc.

OTIS ALLEN KENYON.

Witnesses:
WARREN B. HUTCHINSON,
ARTHUR G. DANNELL.